United States Patent [19]

Collins et al.

[11] Patent Number: 4,748,651
[45] Date of Patent: May 31, 1988

[54] MULTILINE TRANSMISSION LINE TEST RECEPTACLE WITH PROVISION FOR TESTING EACH LINE

[75] Inventors: Thomas J. Collins, Wall; Anthony L. Nieves, Bradley Beach; Thomas G. Graham, Ocean, all of N.J.

[73] Assignee: Keptel, Inc., Tinton Falls, N.J.

[21] Appl. No.: 62,089

[22] Filed: Jun. 12, 1987

[51] Int. Cl.⁴ .......................... H04B 3/46; H04M 1/24
[52] U.S. Cl. ........................................ 379/22; 379/27
[58] Field of Search ................. 379/22, 27, 26, 387, 379/397, 399, 441

[56] References Cited

U.S. PATENT DOCUMENTS 4,488,011 12/1984 Rogers .................................. 379/27

Primary Examiner—Stafford D. Schreyer
Attorney, Agent, or Firm—R. Gale Rhodes, Jr.

[57] ABSTRACT

A multiline telephone test receptacle for allowing testing of more than one telephone line connected to the receptacle in a convenient manner, for example, with a single line telephone set, without requiring special connections. In one embodiment, a movable member having an opening which is positionable in two positions over a telephone jack cavity allows contacts of a telephone plug to engage different ones of the telephone lines connected to the jack in the two positions, thus providing a convenient means for testing the two lines. In another embodiment, the contacts of the telephone jack cavity are disposed on a movable member and the opening is fixed. The telephone test receptacle can be expanded to allow testing of more than two lines.

15 Claims, 3 Drawing Sheets

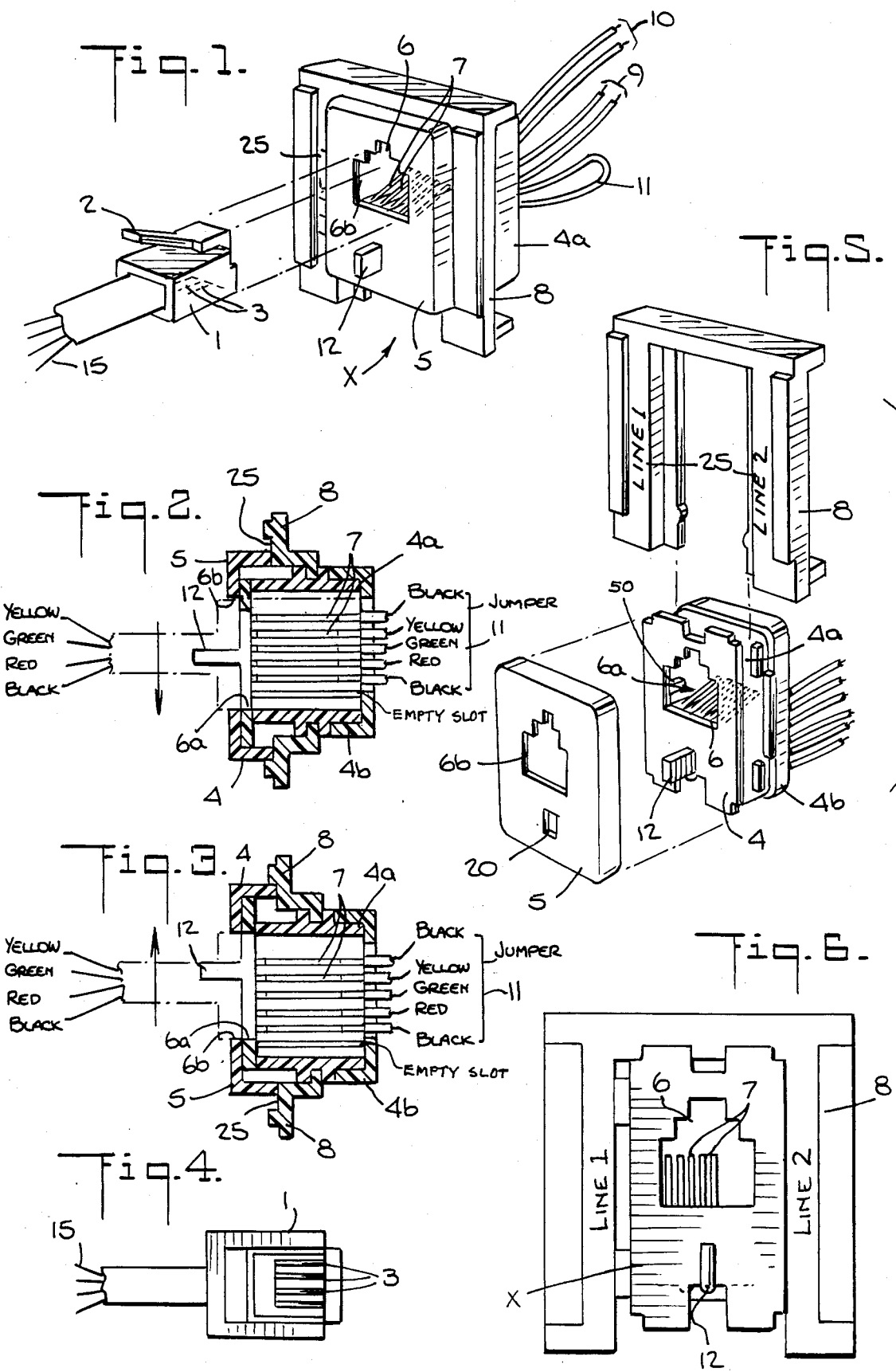

MULTILINE TRANSMISSION LINE TEST RECEPTACLE WITH PROVISION FOR TESTING EACH LINE

BACKGROUND OF THE INVENTION

This invention relates generally to a multiline transmission line test receptacle having provision for testing each transmission line. More specifically, this invention relates to a multiline modular telephone receptacle which enables the user to test a plurality of telephone lines connected to the modular telephone receptacle with, e.g., a single line telephone set.

It is common for a telephone receptacle to be connected to a plurality of telephone lines. Typically, such telephone receptacles are positioned either in a wall or in a piece of equipment which makes it difficult or impractical to connect standard test equipment individually to each of the individual telephone lines connected to the telephone receptacle on the network side. In order to be able to check operation of each of the telephone lines, a user must connect test equipment (or a standard telephone set) to the proper conductors of the modular telephone receptacle, which can be a difficult and time-consuming task. The need exists, therefore, for an apparatus and method which permits convenient testing of each of a plurality of telephone lines connected to a single modular telephone receptacle.

It would also be desirable that such a testing apparatus utilize a standard telephone set to detect proper operation of each of the plurality of telephone lines connected to the modular receptacle. Such a device would preferably provide a means for selectively switching contact between the test telephone set and each individual telephone line connected to the telephone receptacle on the network side. Such a device would also preferably provide a convenient means for interconnecting the test telephone set and telephone receptacle that would also accommodate the switching of the connection of the telephone set from one telephone line to another.

SUMMARY AND OBJECTS OF THE INVENTION

It is therefore an object of the present invention to provide a multiline transmission line test receptacle having provision for allowing testing of each line.

It is furthermore an object of the present invention to provide such a test receptacle which is particulary useful in the telephone field.

It is a further object of the present invention to provide a multiline telephone receptacle which permits a standard telephone set to be used as a testing device for each of a plurality of telephone lines connected to the receptacle.

It is a further object of the present invention to provide a multiline telephone receptacle which permits the selective interconnection of individual telephone lines with the test telephone set.

Other objects of the present invention will be in part obvious and in part hereinafter pointed out.

In accordance with the above stated objects, according to one embodiment of the invention, a multiline test receptacle is provided in which a receptacle means comprises a cavity that has a plurality of contact means positioned therein which are adapted to be connected to a plurality of transmission lines. The receptacle means is adapted to receive plug means which have a plurality of connecting means engageable with respective ones of the contact means of the receptacle means. Movable means that define an opening into the cavity are adjustably disposed on the receptacle means so that engagement of certain ones of the connecting means and contact means upon insertion of the plug means through the opening into the cavity of the receptacle means is dependent upon the position of the movable means.

In one embodiment of the present invention, the receptacle means comprises a single modular telephone receptacle having, e.g., five or more telephone plug contacts connected to two telephone lines (each line comprising two wires) and oriented so that engagement of the contacts with the plug connecting means in a first position of the movable means transmits an electrical signal from a first telephone line to the plug connecting means and a test telephone set connected to the plug connecting means and in a second position of the movable means from the second telephone line.

In another embodiment of the invention, a multiline test receptacle is provided in which a receptacle means comprises a cavity that has a plurality of contact means positioned therein which are adapted to be connected to a plurality of transmission lines. The receptacle means is adapted to receive plug means which have a plurality of connecting means engageable with respective ones of the contact means of the receptacle means. The contact means of the receptacle means are disposed on a movable means located in the cavity so that engagement of certain ones of the connecting means and contact means upon insertion of the plug means into the cavity of the receptacle means is dependent upon the position of the movable means.

Other modifications are possible so that the invention can also be embodied by other multiline receptacles having provision for testing more than two telephone lines.

BRIEF DESCRIPTION OF THE DRAWINGS

FIG. 1 illustrates a multiline telephone test receptacle of the present invention in perspective view.

FIG. 2 provides a top cross-sectional view of the multiline telephone test receptacle of the present invention and further illustrates the interconnection of the plurality of telephone lines with the receptacle and the positioning of the movable member in the first position.

FIG. 3 provides a top cross-sectional view of the multiline telephone test receptacle of the present invention in which the movable member has been switched to a second position.

FIG. 4 depicts an elevated cross-sectional view of a conventional telephone-type modular plug received in the receptacle according to the present invention.

FIG. 5 is an exploded perspective view illustrating the arrangement of the receptacle and movable member of the present invention and further illustrating a position indicating frame which indicates the position of the adjustable member.

FIG. 6 is a front view of the receptacle of the present invention, showing the movable member and position indicating frame.

DETAILED DESCRIPTION

Figure 7A:
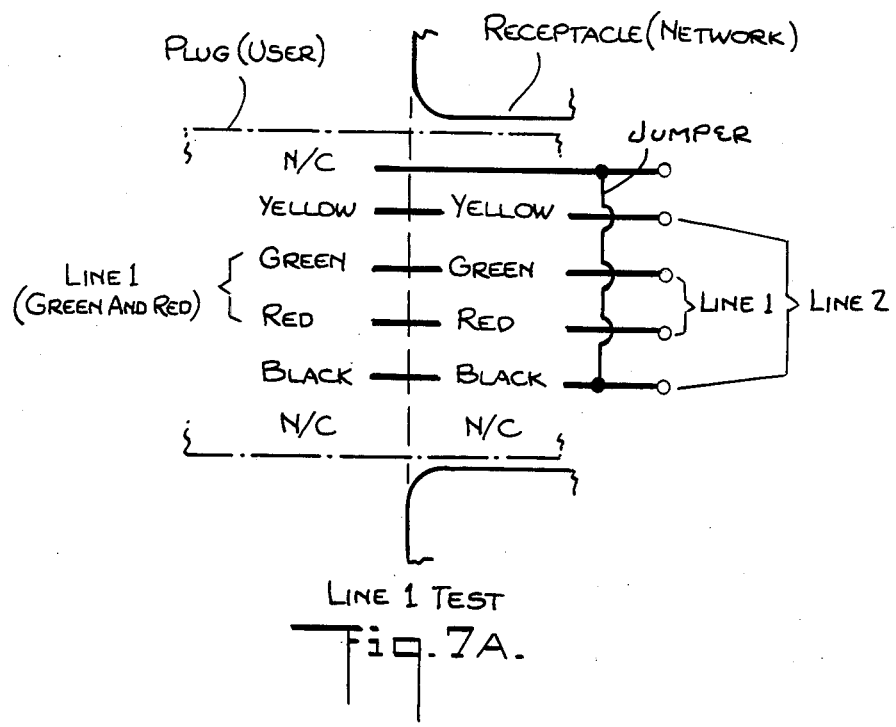
FIGS. 7a and 7b show schematically how testing of two different lines is accomplished.

With reference now to the drawings, one embodiment of the multiline telephone test receptacle is illustrated in FIG. 1 and is generally indicated by X. The multiline test receptacle is adapted to receive a plug 1 having a plurality of connecting contacts 3 and detent 2. Plug 1 is received in a cavity 6 of the receptacle X. A movable member 4 (see FIG. 5) is disposed slidably on a receptacle base member 4a into which cavity 6 is molded. Cavity 6 contains a plurality of contacts 7 positioned there within and connected on the network side to a plurality of conductors comprising, e.g., two telephone transmission lines 9 and 10. Movable member 4 is also provided with legs 50 which extend into cavity 6 to prevent the plug 1 received therein from shifting sideways in cavity 6. In FIGS. 2, 3, 7a and 7b, one telephone line is represented by the red and green wires and the other by the yellow and black wires on the receptacle or network side. Jumper line 11 is provided as will be explained below and couples the black wire to two of the receptacle contacts 7 disposed on opposite sides of the cavity 6. Wire color coding designations are provided herein for ease of presentation of the invention, but are not intended to limit the scope of the invention.

The movable member 4 having an opening 6a defining an opening into cavity 6 can be moved from a first position illustrated in FIG. 2 by exerting a force against tab 12 to a second position illustrated in FIG. 3 when plug 1 is removed from cavity 6. Depending upon the positioning of movable member 4, opening 6a will be aligned with cavity 6 so that a selected two of the conductor contacts 3 of the plug 1 will be aligned with a respective set of the contacts 7 of the receptacle 4.

As shown in FIG. 2, receptacle X may have its contacts 7 connected to four wires from the telephone network defining two telephone lines. (Line 1- red, green; line 2 -yellow- black). This is shown schematically in FIGS. 7a and 7b. Typically, a test instrument such as a standard single line telephone will have four input wires, although generally only two are used, e.g. red and green. The yellow and black wires are not used or are provided for other purposes.

In a first position of the movable member 4, the red and green wires of the plug 1 connected to the test telephone will contact the corresponding contacts 7 of the receptacle X connected to the network red and green conductors. See FIG. 7a. Accordingly, line 1 (red-green) can be checked when member 4 is in position 1. If line 1 is operational, the telephone set should function normally.

Figure 7B:
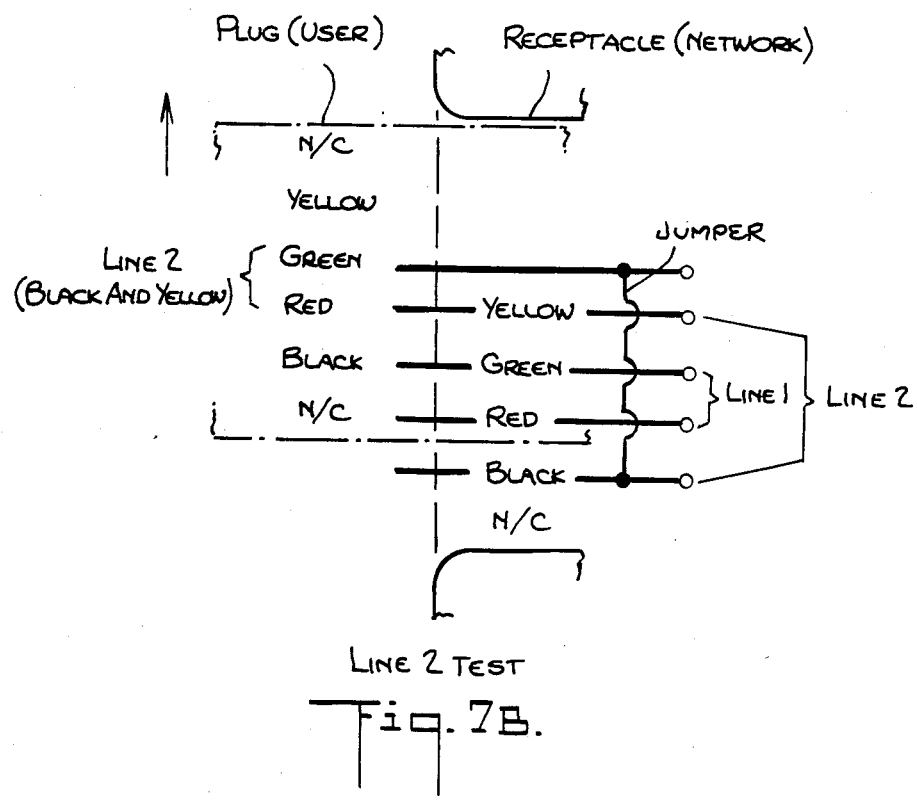
Figure 8:
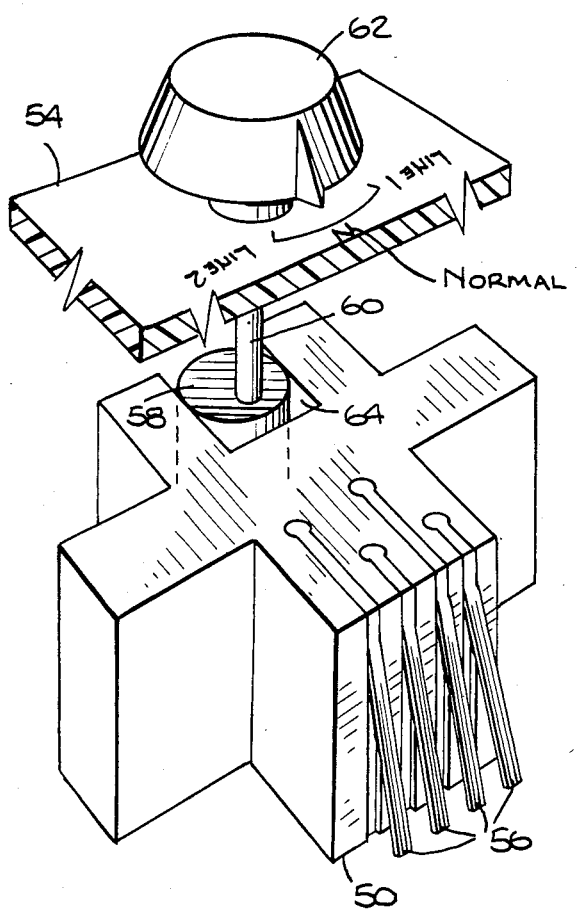
FIG. 8 shows an alternative embodiment of a portion of a multiline test receptacle according to the invention wherein the contacts of the receptacle are disposed on a movable member.

To check line 2 (Yellow-black on the network side), movable member 4 is moved to position 2. In the embodiment shown, movable member 4 is slidably disposed on receptacle member 4a. As shown in FIG. 3 and FIG. 7b, when member 4 is moved, opening 6a is aligned with cavity 6 in a shifted position so that different ones of the contacts 3 and 7 engage. In particular, the contacts 3 of the plug 1 connected to the red and green wires now engage, respectively, the contact 7 connected to the jumper wire and the contact 7 connected to the yellow wire. Thus, line 2 (yellow-black) can be checked when member 4 is in position 2. Of course, line 2 now appears across the red-green wires connected to plug 1 due to the shifting of the contacts.

FIG. 5 depicts the arrangement of components in an exploded view. As shown, receptacle base member 4a can be slidably inserted into a frame 8. Frame 8 can include legends 25 printed or molded thereon to indicate which line is being tested. If line 1 is being tested, the line 2 legend is covered by movable member 4 for example. A flexible dust cover 5 may also be provided to cover member 4. Dust cover 5 is suitably provided with an opening 6b to allow plug 1 to pass therethrough and in alignment with opening 6a of movable member 4. Dust cover 5 is also provided with an opening 20 for tab 12 and may be made of a suitable flexible rubber or plastic material. It can be attached to member 4 by suitable flexing or by "snap" tabs which engage the upper and lower surfaces of movable member 4.

FIG. 6 is a front view of the receptacle 4 with dust cover 5 removed. As shown also in FIGS. 2 and 3, receptacle X also includes a cover 4b which is snapped or cemented to receptacle base member 4a to protect the wire connections.

When plug means 1 such as that illustrated in FIG. 4 is removed from the receptacle X by depression of detent 2 illustrated in FIG. 1 when in position to test line 1, it is possible to move movable member 4 from the first position illustrated in FIG. 2 to the second position illustrated in FIG. 3 by exerting a force on tab 12.

An alternative embodiment of the present invention is shown in FIGS. 8, 9, 10 and 11. These figures show a movable member 50 which is disposed in a cavity 52 in a frame 54. The movable member 50 has disposed thereon a plurality of contacts 56 which comprise two telephone lines (4 conductors). Movable member 50 can be moved from a first test position shown in FIG. 10, wherein line 1 is tested to a second position shown in FIG. 9 wherein line 2 may be tested, or vice versa. In contrast to the design of the multiline test receptacle shown in FIGS. 1 through 7, in the multiline test receptacle shown in FIGS. 8 through 11, the two telephone lines are connected to the contacts 56 such that two selected adjacent contacts form a line pair. See FIG. 11. In the embodiment shown in FIGS. 1 to 7, one line pair comprises two inner adjacent contacts, and the second line pair is disposed about the first line pair. See FIGS. 7a and 7b.

Figure 11:
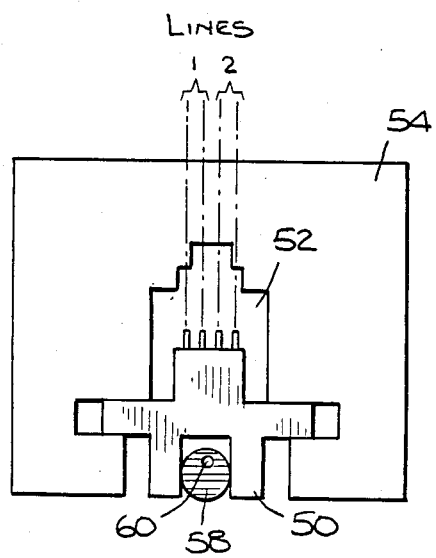
FIG. 11 shows the multiline test receptacle of FIGS. 9 and 10 in a normal two line position.

In the embodiment of FIGS. 8 to 11, a third or normal usage position is provided. This is shown in FIG. 11. In the normal position, a telephone plug like the plug shown in FIG. 4 is received in cavity 52 and makes electrical contact with contacts 56. The plug must be appropriately wired so that the two telephone lines (line 1 and line 2) make contact with the appropriate contacts of movable member 50 when in the normal position.

In order to switch between the three positions, a cam arrangement comprising a cam or eccentric member 58 coupled to a shaft 60 which is in turn coupled to a knob 62 may be provided. Knob 62 is rotated between the three positions shown to change the position of movable member 50. Cam 58 engages in a slot 64 in movable member 50 in order to change the position of movable member 50.

Figure 9:
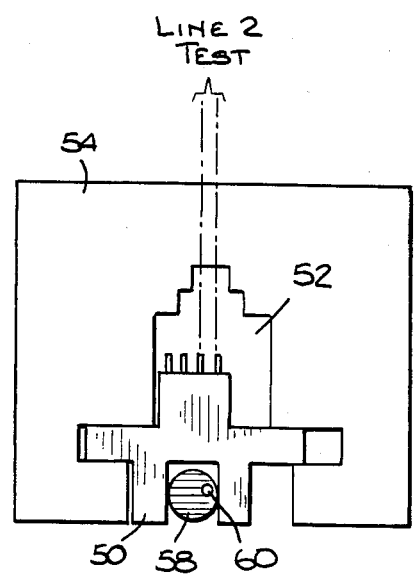
FIG. 9 shows the multiline test receptacle, of which a part is shown in FIG. 8, in a first test position.
Figure 10:
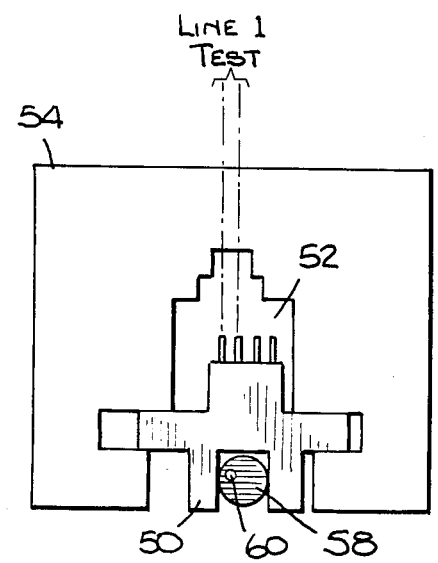
FIG. 10 shows the multiline test receptacle of FIG. 9 in a second test position.

As shown in FIGS. 9 and 10, a normally wired plug (as in FIGS. 2 and 3) is inserted into the cavity 52 and, depending on the position of member 54, the appropriate line can be tested for operation, with, e.g., a standard telephone set.

It is understood that the invention is not limited to the illustrations described and shown herein, which are deemed to be merely illustrative of the best modes of carrying out the invention. The invention also encompasses all such modifications which are within the scope of the following claims. For example, the invention can be expanded to include provision for testing more than two telephone lines, in which case, additional test positions could be provided, for example additional positions of movable members 4 or 50.

What is claimed is:

1. A multiline test receptacle comprising:
    receptacle means defining a cavity for receiving a plug means, said receptacle means having a plurality of contact means positioned within the cavity adapted to be connected to a plurality of transmission lines; and
    movable means defining an opening disposed over said receptacle means, said movable means being positionable in at least two positions so that said opening is disposed in at least two different alignments with said cavity, whereby engagement of selected ones of the contact means of the receptacle means with selected ones of contact means of the plug means upon insertion of the plug means through the opening of the movable means and into the cavity of the receptacle means is provided in said at least two positions, thereby allowing testing of a first of said transmission lines in a first position of said movable means and testing of a second of said transmission lines in a second position of said movable means.

2. The multiline test receptacle recited in claim 1 wherein the movable means is slidably movable from said first to said second position, the position of the movable means thereby determining which contact means of the plug means will engage the corresponding contact means of the receptacle means upon insertion of the plug means into the receptacle means.

3. The multiline test receptacle recited in claim 2 further comprising frame means for mounting said receptacle means.

4. The multiline test receptacle recited in claim 3 wherein said frame means include legends for indicating the position of said movable means.

5. The multiline test receptacle recited in claim 1 wherein said receptacle means includes jumper means connecting at least two of said contact means of said receptacle means together whereby the plug means when inserted into said receptacle means is connected to different telephone lines in said two positions.

6. The multiline test receptacle recited in claim 1, further comprising user engageable means for moving said movable means.

7. The multiline test receptacle recited in claim 1, wherein said receptacle means is adapted to be coupled to a plurality of telephone transmission lines.

8. A multiline test receptacle comprising:
    receptacle means defining a cavity for receiving a plug means; and
    movable means positionable in at least two positions disposed in said cavity and having a plurality of contact means disposed thereon adapted to be connected to a plurality of transmission lines whereby engagement of selected ones of the contact means of the movable means with selected ones of contact means of the plug means upon insertion of the plug means into the cavity of the receptacle means is provided in said at least two positions, thereby allowing testing of a first of said transmission lines in a first position of said movable means and testing of a second of said transmission lines in a second position of said movable means.

9. The multiline test receptacle recited in claim 8 wherein the movable means is slidably movable from said first to said second position, the position of the movable means thereby determining which contact means of the plug means will engage the corresponding contact means of the receptacle means upon insertion of the plug means into the receptacle means.

10. The multiline test receptacle recited in claim 9 further comprising frame means for mounting said receptacle means.

11. The multiline test receptacle recited in claim 10 wherein said frame means include legends for indicating the position of said movable means.

12. The multiline test receptacle recited in claim 8, further comprising a third position of said movable means, said third position defining a normal usage position of said test receptacle, said first and second positions comprising test positions for testing respective ones of said transmission lines.

13. The multiline test receptacle recited in claim 8, further comprising user engageable means for moving said movable means.

14. The multiline test receptacle recited in claim 13 further comprising cam means coupling said user engageable means and said movable means for moving said movable means between said two positions.

15. The multiline test receptacle recited in claim 8, wherein said movable means is adapted to be coupled to a plurality of telephone transmission lines.

* * * * *